US006700923B1

(12) United States Patent
Dowling et al.

(10) Patent No.: US 6,700,923 B1
(45) Date of Patent: Mar. 2, 2004

(54) ADAPTIVE MULTIPLE ACCESS INTERFERENCE SUPPRESSION

(75) Inventors: Eric M. Dowling, Holmes Beach, FL (US); Umesh G. Jani, Richardson, TX (US); Zifei Wang, Thousand Oaks, CA (US); Richard M. Golden, Plano, TX (US)

(73) Assignee: Board of Regents the University of Texas System, Austin, TX (US)

( * ) Notice: Subject to any disclaimer, the term of this patent is extended or adjusted under 35 U.S.C. 154(b) by 0 days.

(21) Appl. No.: 09/474,653

(22) Filed: Dec. 29, 1999

Related U.S. Application Data

(60) Provisional application No. 60/114,637, filed on Jan. 4, 1999, and provisional application No. 60/136,075, filed on May 26, 1999.

(51) Int. Cl.[7] .......................... H03D 1/00; H04B 1/707
(52) U.S. Cl. ....................... 375/148; 375/343
(58) Field of Search .............................. 375/140, 148, 375/208, 342; 370/201, 291, 342

(56) References Cited

U.S. PATENT DOCUMENTS

| 5,343,496 | A | | 8/1994 | Honig et al. ................ 375/1 |
|---|---|---|---|---|
| 5,363,403 | A | | 11/1994 | Schilling et al. ............ 375/1 |
| 5,463,660 | A | * | 10/1995 | Fukasawa et al. ......... 370/342 |
| 5,481,533 | A | | 1/1996 | Honig et al. ............... 370/18 |
| 5,553,062 | A | | 9/1996 | Schilling et al. ........... 370/18 |
| 5,572,552 | A | * | 11/1996 | Dent et al. ................ 375/343 |
| 5,602,832 | A | * | 2/1997 | Hudson .................... 370/342 |
| 5,629,929 | A | | 5/1997 | Blanchard et al. ........ 370/201 |
| 5,644,592 | A | | 7/1997 | Divsalar et al. ........... 375/206 |
| 5,671,247 | A | | 9/1997 | Souissi et al. ............. 375/200 |
| 5,680,419 | A | | 10/1997 | Bottomley ................. 375/347 |
| 5,687,162 | A | | 11/1997 | Yoshida et al. ............ 370/203 |
| 5,719,852 | A | | 2/1998 | Schilling et al. .......... 370/201 |
| 5,809,058 | A | * | 9/1998 | Sato ......................... 375/148 |
| 5,838,740 | A | * | 11/1998 | Kallman et al. .......... 375/346 |
| 5,894,473 | A | * | 4/1999 | Dent ......................... 370/342 |
| 5,909,470 | A | * | 6/1999 | Barratt et al. ............. 375/324 |
| 6,377,611 | B1 | * | 4/2002 | Hwang ..................... 375/140 |
| 6,445,692 | B1 | * | 9/2002 | Tsatsanis .................. 370/342 |
| 2001/0017904 | A1 | * | 8/2001 | Pukkila et al. ............ 375/350 |

OTHER PUBLICATIONS

Zifei Wang and Eric M. Dowling, "Block Shanno Constant Modulus Algorithm for Wireless Equalizations," ILASSP, 1996, pp. 2678–2681.

* cited by examiner

Primary Examiner—Stephen Chin
Assistant Examiner—Lawrence Williams
(74) Attorney, Agent, or Firm—Gardere Wynne Sewell LLP

(57) ABSTRACT

An apparatus and method for spread spectrum multiuser communication receivers is disclosed that includes, an adaptive filter adapted to minimize a block error function, wherein the filter tap weights are updated according to a non-linear optimization algorithm adapted for block processing of time-varying data.

35 Claims, 3 Drawing Sheets

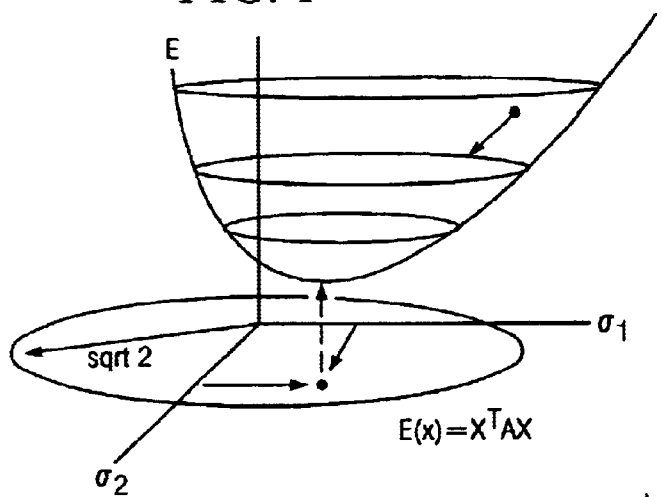
FIG. 1
FIG. 2
FIG. 3
(PRIOR ART)
DATA BLOCK MATRIX
DATA BLOCK LENGTH = L
FILTER LENGTH = 4
k = k SYMBOL RATE
FIG. 4
NON-TOEPLITZ MATRIX
LENGTH M FILTER
M CHIPS PER ROW OR
1 BIT PER ROW
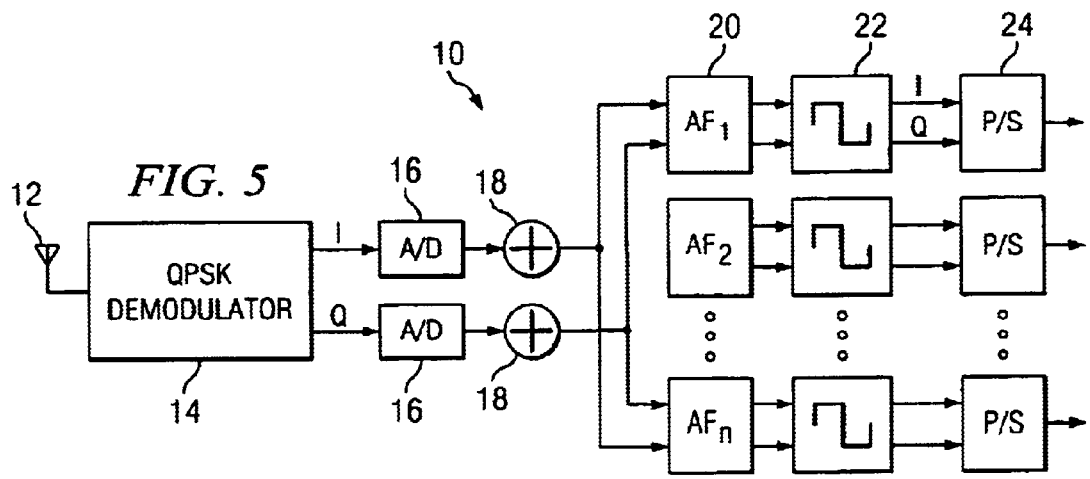
FIG. 5

ADAPTIVE MULTIPLE ACCESS INTERFERENCE SUPPRESSION

This application claims priority from United States Provisional Patent Application Ser. No. 60/114,637, filed Jan. 4, 1999 and United States Provisional Patent Application Ser. No. 60/136,075, filed May 26, 1999.

TECHNICAL FIELD OF THE INVENTION

This invention relates generally to adaptive signal processing structures for communication systems, and more particularly, the invention relates to an adaptive receiver structure that may be used to extract an information sequence associated with a wireless subscriber from a composite received signal. The composite received signal may include components of coded information sequences generated by multiple subscribers, additive ambient noise and effects of channel distortion.

BACKGROUND OF THE INVENTION

Without limiting the scope of the invention, its background is described in connection with code division multiple access telecommunication devices and systems, as an example.

Heretofore, in this field, a user using a wireless handset transmits information from the handset to a base station. In commercial applications the wireless handset is most commonly a cellular phone or a personal communication system (PCS) phone. In military and other applications involving wireless transmission, the wireless handset may be generally be any mobile radio apparatus such as a spread spectrum transceiver or a mobile satellite terminal. A communication protocol used to transmit and receive wireless signals between the wireless handset and the base station is called an air interface. The air interface is typically agreed upon by an international standards committee.

Base stations generally include infrastructure equipment connected to a telephone network via a switching architecture. The base station processing circuits transmit and receive wireless signals to and from a set of wireless subscribers using an air interface protocol. In current commercial applications, for example, the base station is often deployed by a telephone company to pass cellular or PCS wireless traffic using one or more air interface standards. Other common air interface standards include analog service, time division multiple access (TDMA) and code division multiple access (CDMA). The most common analog air interface is known as advanced mobile phone service (AMPS). The most common TDMA air interfaces are IS-136 in the United States and Japan, and Global System Mobile (GSM) in Europe.

The most common CDMA air interface is called IS-95. New standards continue to emerge, especially as PCS becomes more prevalent. Also, many proprietary systems and military systems are also deployed. A wireless infrastructure is commonly created using a plurality of base stations connected via land lines (or microwave links) to a telephone network. A given base station analyzes the power in a given received signal to ensure it processes only the calls of those wireless subscribers closest to the given base station. Peer base stations may compare measurements to make a determination as to which base station will handle a given call at a given moment. When a subscriber travels from the coverage area of one base station to another, the base station currently processing the call is said to "hand the call off" to the base station which will next handle the call.

Multi-user interference suppression algorithms make use of the properties of the multi-user interference in order to suppress errors due to other user's signals which appear as special type of noise with known properties. These algorithms require the conversion of large matrices to jointly estimate the subscriber signals at once. A large matrix problem is formulated and all of the multiple user's data signals are jointly estimated. This approach provides a benchmark for quality, but is too costly to implement in real time using modern digital signal processor technology.

SUMMARY OF THE INVENTION

It has been found, however, that the present methods for reducing the channel noise fail to correct for the additive ambient noise caused by multiple access interference (MAI) in CDMA systems. Due to MAI, the number of subscribers that can be accommodated by a CDMA base station is greatly limited. MAI is the noise created by the coded signals transmitted by all but a designated subscriber. The CDMA receiver must separate the designated signal from the MAI created by all the other users.

The present inventors have recognized that a significant problem of current methods for noise reduction is the high cost of the systems. For example, multiuser detectors make use of the fact that the base stations have knowledge of the spreading codes of the interfering signals to estimate the number of signals received concurrently at the base station. While the multiuser detector approach may lead to very high performance, it is extremely costly because large matrices must be processed to determine all of the interrelated and coded signal information. The problem is compounded when the effects of multi-path fading channels are taken into account.

An alternative form of multiuser detection known as multiple access interference suppression has been proposed. For example an MMSE multiple access interference suppression system is described in L. Zhu et. al., "Adaptive interference suppression for direct sequence CDMA over severely time-varying channels," IEEE Globecom 1997 (henceforth the "Zhu reference"). This type of objective function is known as decision-oriented because the receiver decides which symbol was sent and computes an error. In practice, however, an adaptive filter's tap weights is adjusted to reduce the mean square error between the filter output and a set of constellation points. The recursive least squares algorithms, however, are also known to be very expensive in terms of cost of implementation and have known stability problems. Also, since these methods rely on past decisions generated by the receiver, the method breaks down when the signal conditions are unfavorable and too low of a number of decisions are erroneous for the receiver to lock onto the signal.

Another attempt to address the problem of MAI has been to apply a modulus restoration algorithm to achieve multiuser detection. Such a scheme is described in W. Lee, et. al, "Constant modulus algorithm for blind multiuser detection," IEEE Spread Spectrum Communications Workshop, 1996. Multiuser detection is performed by using a bank of modulus restoration adaptive filters. The method proposed in the Lee reference has the advantage of requiring fewer computations than competing multiuser detectors, however, it has the disadvantage of a slow convergence rate and poor steady-state behavior when compared to the more expensive matrix-based and multiuser detectors.

The present inventors recognized that a problem with the use of modulus restoration adaptive filters is that it requires, a priori, information regarding signal and channel parameters in order to set a step size parameter used by the constant modulus algorithm. Hence, while the algorithm may be made to perform well in a simulated environment where this information is known, the method will not function properly in a time-varying and unknown environment as encountered by signal processors operating within mobile cellular and PCS air interface equipment.

The present inventors have also recognized that one way to improve the performance of modulus restoration adaptive filters would be to use Recursive Least Squares (RLS) based adaptive filter to perform modulus restorative adaptive filtering. RLS-based adaptive filters do not require a step-size parameter and converge more rapidly than the Least Mean Squares (LMS) based approach. RLS-based filters, however, are expensive to implement in real time and do not guarantee stability. Moreover, fast RLS algorithms involve underlying data Toeplitz matrices. If these algorithms are attempted chip-rate sampled CDMA data streams, the stability problems worsen.

Methods have also been advanced to adapt an adaptive filter to minimize a constant modulus objective function using a nonlinear optimization algorithm. The nonlinear optimization algorithm is made to function with time-varying data by segmenting the input data into blocks. Multiple iterations of the algorithm may be performed on each block, and an adaptive step size is calculated at each iteration without the need for unavailable a priori information.

Moreover, algorithms may be constructed which are guaranteed to update the weights to reduce the error function at each iteration. These algorithms, however, use Toeplitz matrices and are more useful for TDMA and related environments where only a single user makes use of the channel at any given instant (see, e.g., "Block Shanno Constant Modulus Algorithm for Wireless Equalizations,: Wang and Dowling, Proceedings of the IEEE ICASSP 1996; "Stochastic conjugate gradient constant modulus blind equalizer for wireless communications," Wang and Dowling, Proceedings of the IEEE ICC 1996.)

The present invention solves these and other problems by providing low cost and efficient methods and apparatus to restore a received signal which has been corrupted by a multipath fading channel, additive Gaussian noise, and/or MAI. While the preferred embodiments focus on restoration of signals associated with TDMA and CDMA wireless communications systems, the inventive methods and apparatus may be applied to other types of systems, for example wireline systems to include twisted pair, coaxial cables, and fiber channels. An important aspect of the present invention is a quasi-Newton adaptive filter structure used to perform modulus restoration of a received signal. This filter may be used to perform both channel equalization in TDMA systems and multiple access interference suppression in CDMA systems. The inventive quasi-Newton filter may also be applied to non-communication system related problems which involve the minimization of a cost function for which a gradient and a maximum a posteriori (MAP) or a pseudo-MAP step size may be computed.

The invention solves the prior art problem of high cost CDMA base stations by replacing the need to perform costly matrix-based multiuser detection or MMSE based multiple access interference suppression with a much more economical modulus restoration approach. The approach of the present invention has a computational requirement similar to the conventional RAKE receiver while providing significant performance gains normally associated with the more expensive multiuser detectors.

The invention also solves the problem of needing to make engineering trade-offs when deciding between a low-cost, slow converging constant modulus equalizer or a much more expensive but faster converging constant modulus equalizer. That is, the invention provides a low cost but high performance constant modulus equalizer structure operative to restore both TDMA, CDMA and related signals after having been corrupted by channel distortions and additive noise.

The invention is enabled by a novel quasi-Newton adaptive filter structure and method which is related to a generalized form of conjugate gradient minimization scheme as proposed in the Wang reference. However, the method of the Wang reference is designed for TDMA data and thereby uses a Toeplitz data matrix. If such an approach is applied to CDMA data, ill conditioning resulting in large errors results. Also, the computation increases quadratically with the number of filter taps since much work is wasted processing non-symbol related information. Even when the data blocks are redesigned to support CDMA processing in accordance with the present invention, when the Wang reference is applied to CDMA signals, an erroneously recovered signal constellation results. This is because the Wang reference teaches to drive the error below a threshold, and when this is done with CDMA data, the recovered signal constellation smears out along a unit circle. The present algorithm employs an early-stopping strategy of advancing at most a fixed number of iterations each update in order to correct this deficiency and to produce a working CDMA system. These two distinctions produce a constant modulus filter which reduces computation by an order of magnitude and produces a higher accuracy output signal. Beside these advancements over the Wang reference discussed hereinabove, the present invention teaches a method of perform multiple access interference suppression in CDMA systems.

The present invention also includes a communications receiver having an adaptive filter adapted to minimize an error function, wherein the error function is calculated using differences between output blocks generated by the adaptive filter. The output blocks will generally correspond to repeated blocks inherent in a communications protocol used by the CDMA receiver.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a graphical representation of an error surface used to illustrate function minimization via a gradient based approach.

FIG. 2 shows the basic configuration of a matrix, designated X(n);

FIG. 3 is an example of a matrix used in the prior art, generally as a Toeplitz matrix;

FIG. 4 is an example of a non-Teoplitz matrix used with the present invention for error correction.

FIG. 5 is a block diagram representing a system for using adaptive filter structure;

DETAILED DESCRIPTION OF THE INVENTION

Figure 6:
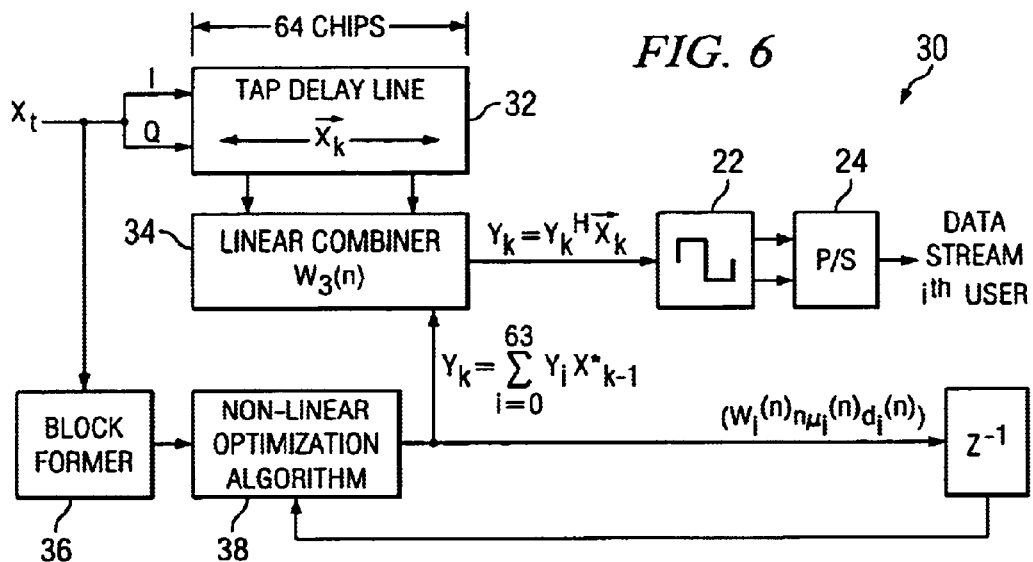
FIG. 6 is a flow chart of the creation and initial comparison of data blocks in accordance with the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

A first categorization of cellular and PCS communication networks is to specify their air interfaces as using analog or digital communication protocols. AMPS systems use a form of frequency modulation which consumes 30 kHz of bandwidth per call. This technique, developed in the late 1970's is costly and inefficient when compared to modern digital air interfaces which consume less bandwidth per call. Analog systems will not be considered further herein. Digital air interface standards for cellular and PCS communication networks are currently implemented with the aforementioned TDMA or CDMA technologies.

TDMA systems assign each subscriber one or more time slots within a frame structure in which to send and receive one or more burst of information. A TDMA base station receives the frame and extracts each subscriber's information burst from within the frame. Different base stations are assigned different carrier frequencies so as to reduce the amount of interference between base stations. Geographically separate base stations may be reassigned the same frequency in order to make efficient use of available frequency spectrum. In TDMA systems, bursts of information must be transmitted at a rate more than six times higher than the data rate on each subscriber channel in order to accommodate the other subscribers and framing overhead. The increased data rate means the receiver has less time to evaluate each bit, and thus the probability of obtaining a bit error increases. Also, as the data rate increases, the effects of channel distortions due to atmospheric conditions and multipath fading increase. Multipath fading is a phenomena which causes the signal strength to change as a function of time due to constructive and destructive interference observed at the receiving antenna. Multipath fading is caused by the simultaneous reception of multiple reflections of the transmitted signal which arrive with different path delays.

Standard TDMA systems typically send what are known as constant modulus signals. A constant modulus signal may be modeled in the complex plane as bouncing between a set of points which lie on a circle of constant radius. These points are called constellation points, and each represents a transmitted symbol. A transmitted symbol in turn represents one or more bits of information. When the signal is received after being transmitted through a multipath fading channel, channel distortions cause the constant modulus property to be destroyed. In essence the signal constellation points move off of a constant radius circle. This makes the decoding of the desired information bit stream difficult and error prone.

A constant modulus adaptive filter is a signal processing structure whose input is a received signal whose constellation points have been distorted away from a circle of a specified radius. After proper adaptation, the output of a constant modulus adaptive filter is a signal whose constellation points have been restored to lie on the circle. A constant modulus adaptive filter may advantageously be used to restore the constellation points to the circle. It is known that a TDMA receiver may use the restored constant modulus signal to make reliable symbol decisions and thus extract the bit streams sent by the subscribers. The decoding of TDMA signals is described in detail in the GSM and IS-136 standards as well as in the text book "Wireless Communications—principles and practice," T. S. Rappaport, Prentice-Hall 1996. These three references are incorporated herein by reference.

CDMA systems operate on a different principle than TDMA systems. Instead of each subscriber sending a burst of information into a time-slot within a frame structure, each subscriber within the coverage of a given base station sends their signals simultaneously. However, each subscriber modulates a different code onto their information stream prior to transmission. The receiver at the base station is able to separate the different subscriber signals using a technology known as spread spectrum signal separation which is the basis for CDMA. Spread spectrum coding techniques are discussed in detail in the ITU-T IS-95 standard and in the book entitled "Applications of CDMA in wireless/personal communications" by V. K. Gary et. al., Prentice-Hall 1997. CDMA systems are also described in "Cellular Mobile Systems Engineering," by S. Faruque, Artech House Publishers, 1996.

In CDMA communication systems, the reception and extraction of an information sequence transmitted by a designated subscriber requires the suppression of channel noise. The channel noise is modeled as additive ambient noise together with multiple access interference (MAI). The additive ambient noise is often mathematically modeled as having a flat power spectral density function and a Gaussian probability density function. The concept of modeling ambient background noise as an additive white Gaussian process is well known so will not be discussed further herein. An important problem which limits the number of subscribers which can be accommodated by a CDMA base station is the presence of MAI. MAI is the noise created by the coded signals transmitted by all but a designated subscriber. The CDMA receiver must separate the designated signal from the MAI created by all the other users.

A traditional approach to separating the designated signal from the MAI code is to consider the MAI to be equivalent to additional ambient background noise. Using this assumption, a correlation based receiver is used to match the designated signal to the code employed by the designated subscriber. This is called matched filtering, and works well provided the codes are different enough so that the amount of energy leakage from the MAI to the output signal of a correlation filter for the designated code is sufficiently small. As the number of users and the amount of channel distortion increases, the amount of energy spill-over from the MAI to the correlation filter output also increases, thus limiting the capacity of the system. The well known RAKE receiver as discussed in the Garg reference and as used in most IS-95 systems uses this correlation filter approach. The RAKE receiver deals with multipath fading by computing multiple matched filtered output signals at different delays and combining them.

Multiuser detection deals with the simultaneous joint estimation of a plurality of spread-spectrum coded information sequences produced by a plurality of subscribers. Multiuser detectors make use of the fact that the base stations have knowledge of the spreading codes of the interfering signals. This knowledge is thus advantageously employed to jointly estimate all of the signals received at the base station at once. While this approach may lead to very high performance, it is extremely costly because large matrices must be processed which contain all of the interrelated and coded signal information. The problem is compounded when the effects of multipath fading channels are taken into account.

Recently an alternative form of multiuser detection known as multiple access interference suppression has been proposed. Multiple access interference suppression techniques have been developed which dramatically reduce the computational load when compared to matrix-based multiuser detectors. For example an MMSE multiple access interference suppression system is described in L. Zhu et. al., "Adaptive interference suppression for direct sequence CDMA over severely time-varying channels," IEEE Globecom 1997 (henceforth the "Zhu reference"). The idea is to minimize a mean squared error objective function where the error is measured between a filter output signal and the closest decision point in the signal constellation associated with the system's modulation scheme. This type of objective function is known as decision-oriented because the receiver decides which symbol was sent and computes an error as the distance from the processed output to this symbol value. The set of transmitted symbol values are known as the constellation points of a signal space. In practice, an adaptive filter's tap weights are adjusted to reduce the mean square error between the filter output and the set of constellation points. The MMSE approach of the Zhu reference uses a recursive least squares type adaptive filtering algorithm to minimize the decision-oriented objective function. Recursive least squares (RLS) adaptive filters are well known in the art and are described in Zhu reference and the references cited therein. Recursive least squares algorithms are known provide high performance estimates and to converge rapidly to a desired solution. However recursive least squares algorithms are also known to be very expensive in terms of cost of implementation. Recursive least squares adaptive filters are also known to have stability problems and may diverge under various operating conditions so as to loose their performance advantages.

Another advancement has been to apply a modulus restoration algorithm to achieve multiuser detection. Such a scheme is described in W. Lee, et. al, "Constant modulus algorithm for blind multiuser detection," IEEE Spread Spectrum Communications Workshop, 1996. Multiuser detection is performed by using a bank of modulus restoration adaptive filters. The base station makes use of knowledge of each subscriber's spreading code by initializing each constant modulus filter to the spreading code of each subscriber. Hence each filter starts out in the vicinity of the desired solution and is allowed to converge to a local minimum of the objective function. A given local minimum corresponds to a point where a designated signal is restored to constant modulus, and as much MAI, Gaussian noise and effects of channel distortion are removed as possible. The method proposed in the Lee reference has the advantage of requiring fewer computations than competing multiuser detectors. The method also has the disadvantages of a slow convergence rate and poor steady-state behavior when compared to the more expensive matrix-based and MMSE-based multiuser detectors.

The most important disadvantage of the technique proposed by Lee is the requirement to have generally unavailable a priori information regarding signal and channel parameters in order to set a step size parameter used by the constant modulus algorithm. Hence, while the algorithm may be made to perform well in a simulated environment where this information is known, the method will not function properly in a time-varying and unknown environment as encountered by signal processors operating within mobile cellular and PCS air interface equipment.

One attempt to improve the performance of the Lee reference would be to use Recursive Least Squares (RLS) based adaptive filter to perform modulus restorative adaptive filtering. RLS-based adaptive filters do not require a step-size parameter and converge more rapidly than the Least Mean Squares (LMS) based approach employed in the Lee reference. However RLS-based filters are expensive to implement in real time. Moreover, they are not guaranteed to be stable and are known to diverge in common situations, especially when applied to the constant modulus problem which involves a non-linear error function. Moreover, fast RLS algorithms involve underlying data matrices which are Toeplitz in structure. If these algorithms are attempted chip-rate sampled CDMA data streams, the stability problems worsen. Ordinary RLS algorithms which do not involve underlying Toeplitz data structures are costly to implement and are known to exhibit instabilities.

Methods have recently been advanced to adapt an adaptive filter to minimize a constant modulus objective function using a nonlinear optimization algorithm. The nonlinear optimization algorithm is made to function with time-varying data by segmenting the input data into blocks. Multiple iterations of the algorithm may be performed on each block, and an adaptive step size is calculated at each iteration without the need for unavailable a priori information. Moreover, algorithms may be constructed which are guaranteed to update the weights to reduce the error function at each iteration. However, these algorithms are useful for TDMA and related environments whereby only a single user makes use of the channel at any given instant. Two such prior art methods have been reported in the literature, and these methods are discussed below.

The first algorithm of this nature is reported in "Block Shanno Constant Modulus Algorithm for Wireless Equalizations by Wang and Dowling in the proceedings of the IEEE ICASSP 1996. In this article a method is provided that forms blocks of data gathered from an antenna array. Data is sampled at the symbol rate, and blocks are formed by whose rows comprise as many data elements as there are antennas. The nonlinear optimization algorithm is executed for each block, and as many iterations of the algorithm are taken as necessary to drive the error function to a threshold value. The requirement to perform a loop to convergence for each block of data is very expensive. Also, the data matrix structure is not suited to chip-rate sampling. That is, the method is constructed for single user scenarios, and cannot effectively deal with multiuser CDMA data streams. If the method is adapted to form data matrices whose rows involve multiple symbols each comprising multiple chips, the algorithm is found to do well at minimizing the constant modulus objective function, but when the algorithm converges, the recovered data symbols all fall on the unit circle, but the bit error rate is on the order of 50%. This is because the algorithm succeeds at placing the recovered data symbols on the unit circle, but fails to place the symbols on a set of constellation points. Rather, the constellation is the entire unit circle itself.

The second algorithm of this nature is discussed in "Stochastic conjugate gradient constant modulus blind equalizer for wireless communications," by Wang and Dowling, in the Proceedings of the IEEE ICC 1996. This algorithm uses a single antenna receiver structure and forms Toeplitz data matrices from the received samples. The data is sampled at the symbol rate. Instead of allowing the nonlinear optimization algorithm to converge on each block to drive the error function below a threshold, only a single iteration is performed per block. The search direction is not reinitialized to the negative gradient for the first iteration of each block as it is in the previous algorithm, but the conjugate gradient search directions are calculated across blocks. While this algorithm may be well suited to TDMA data, it is not well suited to CDMA data. The present inventors have found that if Toeplitz data matrices are formed for CDMA data, however, the algorithm will. attempt to solve a single user problem and will fail. If the data structures are altered to better accommodate CDMA data, the method will not perform properly in a time-varying environment. That is, the method cannot keep up with a time varying channel within the block size parameters as would be needed in a CDMA system.

The present invention allows a multiuser detector to extract different user's data sequences from a CDMA waveform. It also allows a multiuser detector similar to structures in current use, but without the aforementioned problems. The present method also permits the multiuser detector to function at a lower cost (as compared to matrix inversion based detectors) at a comparable performance. Also, it permits multiuser detectors to be more robust and reduces the sensitivity of current systems to channel variations and signal power level fluctuations. That is, the present invention reduces the unstable behavior of a multiuser detector in the face of rapidly time-varying signal and channel characteristics.

The present invention also allows for the construction of a multiuser detectors that extracts individual user's data sequences from a CDMA waveform by using an adaptive filter based on nonlinear-optimization. Furthermore, it permits the construction of a structure capable of recovering multiple information sequences from a CDMA waveform. Multiuser detectors are also able to minimize various types of objective functions, including: the constant modulus objective function, and others, to recover a information encoded into CDMA signal. The multiuser detector of the present invention improves the cost-to-performance ratio, particularly, when compared to the widely deployed RAKE receiver, but with a significantly higher performance. Multiuser detectors as developed herein have a comparable performance to the costly matrix-inversion based multi-user detectors. Moreover, an aspect of the present invention provides an algorithm that takes advantage of link layer data structures inherent in a CDMA waveform.

FIG. 1 is a graphical representation of an error surface representative of those encountered in spread spectrum transmissions. The value of the error squared is depicted along the E axis. This error is shown as a function of a two-tap filter whose tap weights are represented by the sigma 1 and sigma 2 axes. Adaptive filters such as those employed in the present invention update the tap weights in order to seek the setting corresponding to the minimum of the depicted error surface. Particularly troublesome errors are encountered as the filter tap weights move further from their optimal setting corresponding to the minimum of the depicted parabolic bowl. Those of skill in the art realize that the parabolic representation is an oversimplification of true error surfaces encountered in constant modulus problems. In reality, error surface is constantly changing and non-quadratic. The error surface can change, e.g., when a transmitter moves about within a transmission zone or cell.

The apparatus and method of the present invention allows for the determination of an error correction vector within the parabolic error zone that brings the error rate "downhill" within the error zone toward the pure signal where E is theoretically minimized. By calculating one or more error vectors for correcting the value of the signal, the value approaches the optimum point, that is, where the error is minimized following one or more correction vector steps. Furthermore, the shape of the error bowl or error surface as a function of the filter, again depicted as an oversimplified parabola, changes over time. The complexity of the error function surface also increases greatly with the number of users concurrently using the envelope signal within a cell, as well as, by the complexity of the geography within a cell site.

For example, where a base station is capturing data from several moving sources within a cell, e.g., motor vehicles passing buildings, the error function changes relatively rapidly. The present invention allows a base station to track the changes due to time-varying signal propagation paths in order to maintain the optimum point for correction, given the fact that multiple CDMA transmitters may be constantly moving around all cell area.

FIG. 2 shows the basic configuration of a matrix, designated X(n). The matrix is used as part of an adaptive filter error correction system, designated AF1 for the sake of simplicity. The value t is equal to the chip index and is the component of the signal arranged in vertical columns. The horizontal values are designated K and equal to the bit index (also known as the symbol index).

FIG. 3 is an example of a matrix used in the prior art. Known generally as a Toeplitz matrix, the values contained in the matrix form a diagonal, for example, the value for Xk changes in the diagonal from one row to the next. In CDMA systems, one disadvantage of using a Teoplitz-type matrix is the fact that an ill-conditioned matrix results due to over-sampling at the chip rate. This increases the error levels at the receiver and degrades performance. A Toeplitz matrix also gives rise to unneeded processing, and thus causes an increase in computational complexity equal to the number of tap weights.

FIG. 4 is an example of a non-Teoplitz matrix used with the present invention for error correction. The width of the matrix can be varied, as depicted using a 64-bit wide coding scheme, although the length is not generally important. By using a filter length of M, to accomodate M Chips per row, the matrix contains the information needed to efficiently calculate a vector of outputs related to a particular block of data. Furthermore, it allows filter updates to be made based on use of an entire block of input data.

FIG. 5 is a block diagram representing a system for using an adaptive filter structure, generally designated as 10. An antenna 12 receives a radio frequency (RF) signal and provides this signal to the input of a QPSK demodulator 14. The output from the QPSK demodulator 14 is generally an analog signal, which has been separated into its I-phase (in-phase) and Q-phase (quadrature phase) components. In communication systems, the I-phase and Q-phase components result from a QPSK modulation process whereby first and second data streams are modulated onto first and second sinusoidal carrier signals. The carrier signals are out of phase by ninety degrees. As the QPSK demodulator 14 has converted the input to baseband, the I-phase and Q-phase components no longer are modulated onto carriers, but are represented as complex numbers having a real and an imaginary part. The real part represents the I-phase component while the imaginary part represents the Q-phase component.

Next, the I and Q phase signals (still in analog) enter an analog-to-digital converter 16, which may sample the signal at a chip rate such 1.2288 Mcps which is the chip rate used in IS-95 compliant CDMA systems. The data output is a digital signal that represents the real and imaginary numbers that were converted from an analog to a digital signal. The system of the present invention, however, does not require that the signal exist in an I or a Q phase. It should be noted that the analog-to-digital converters may be moved to an IF stage or to point 12 in some embodiments.

In CDMA systems, a signal with a relatively lower data rate can be multiplied by passage through one or multiple processors to achieve a super high chip rate. For example, the output of the QPSK demodulator 14 may be sampled at 1.2288 Mcps while the data rate is several orders of magnitude lower. The high chip rates allow a single base station to receive, for example, the signals from 50 users at one time. The present invention allows the base antenna to select on which signal from the many signals to focus.

While not required, the I-phase and a Q-phase components enter a mod-2 adder 18, which allows for wrap-around processing of bits. One such mod-2 adder 18 forms part of standard IS95 architecture. Other types of adders may alternatively be used.

The signal output of the mod 2 adder 18 then enters a series of adaptive filters 20, labeled AF1 to AFn. It is in the adaptive filters 20 that a user specific spread code is used to identify the particular user. One such code may be an orthogonal code, such as a Walsh code. The output from the adaptive filters 20 enters a decision box 22, still involving both the I-phase and Q-phase components, which then enter a parallel to serial converter. The parallel to serial converter provides an output that will generally be at twice the symbol rate. The signal entering the adaptive filter 20 will generally be a composite input sampled at a chip rate, depicted a Xt, while the output from the adaptive filter 20 is designated Yk and is at the symbol rate. For IS95 the value of n for the number of adaptive filters 20 may be 8, 16, 64 or even 128. The actual number will vary depending on the needs of the system used and can greatly exceed 128 if necessary.

FIG. 6 shows a more detailed view of a processing channel used to extract a user's signal.

This channel is represented by the blocks 20, 22, and 24 of FIG. 5. The input Xt, in both the I and Q phases are input into a tap delay line 30, in which the vectors defined by the I and Q data input are spread, e.g., 64 chips wide and defined as vector Xk. The tap delay line 32 acts as a shift register, that is, it shift delays the data input so that the data can be transferred into the linear combiner 34 as a block of data, rather than processing the data as a linear input.

The linear combiner is capable of taking a Hermetian transpose in which the imaginary components of the tap-weight values are negated and inner-produced with the input vector, to produce the output of the adaptive filter 20, using the formula: $W_k^H$ times the vector of $X_k$.

At the same time, the data Xt enters the block former 36, which form a non-Teoplitz block matrix, as described in FIG. 3. The block matrix is then run through the non-linear optimization algorithm 38. The output from the non linear optimization algorithm 38 is used to determine an adaptive filter update vector that is combined with current filter tap weights to produce an updated filter tap weight vector. The update is performed to produce a lower error value so as to select the set of tap weights to minimize the error surface as depicted in FIG. 1. A single update does not necessarily achieve the minimum, but each update generally moves closer to the minimum, so that over a span of time, the optimum settings will be achieved. These filter tap weights are then applied to the input data block within the linear combiner 34 to produce an output signal whose error has been reduced. The data output from the linear combiner 34, as processed by the tap-weight supplied by the non-linear optimization algorithm 38 enters decision box 22, which enters parallel to serial converted 24 and is output as a data stream that has been filtered and error corrected for the $i^{th}$ user.

Figure 7:
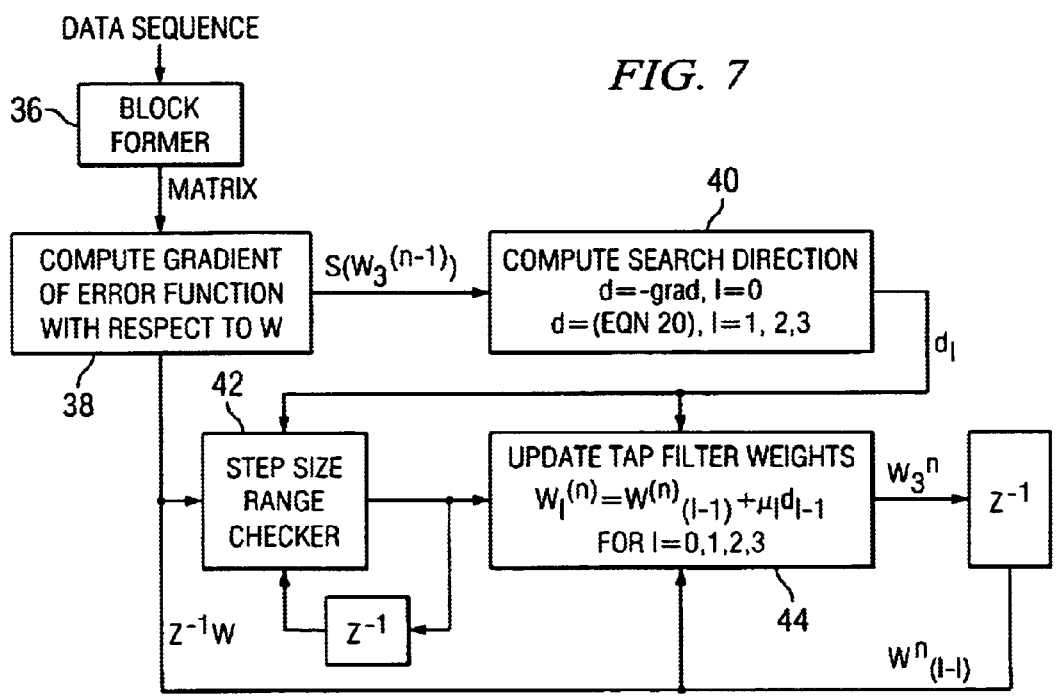
FIG. 7 is a flow chart illustrating a method of performing adaptive filtering in accordance with the present invention.

FIG. 7 shows an example of a block-nonlinear processor used to adapt a filter for use in a CDMA receive according to the present invention. A data sequence as sampled by an analog to digital converter enters the block former which forms a data matrix, such as the non-Teoplitz data matrix of FIG. 4. The data block, now in the form of a matrix (X(n)) enters the compute gradient of the error function 38, that is with respect to w. A compute search direction 40 receives the block input from the compute gradient of error function 38. The search direction is determined in 40, preferably based on the calculations derived hereinbelow and input into a step size range checker 42 and an update tap filter weight 44. The data within both the step size range checker 42 and the update tap filter weight 44 may be run through a number of iterations to obtain vectors that point in the direction of reduced error in a series of steps. The number of steps can be varied, but in one particular embodiment the number of error correction steps is four.

More particularly, to derived the equation used in the compute search direction step 40, a data model is used as the source of data for error correction, e.g., a complex baseband received signal, is given by:

$$r(t) = \sum_n \sum_{k=1}^{K} b_{k,n} A_k(t) c_k(t - nT) + \sigma \Gamma(t) \quad (1)$$

where n(t) is a complex white Gaussian noise process with unit power spectral density in each dirnension, $c_k(t)$ is a unit energy signature waveform associated with the kth user, $A_k$(t) is a complex gain, which accounts for attenuation and fading as seen by the kth user, $b_{k,n}$ is the nth symbol of the kth user, and K is the number of users. For a synchronous system, it suffices to sample the received signal at the chip rate after chip-matched-filtering, and to consider an observation interval equal to the symbol interval.

Given an objective function $f: R^M \rightarrow R$, the classical Newton's algorithm updates the filter tap weights as:

$$w_j = w_{j-1} - H_{newton}^{-1}(w_{j-1}) g(w_{j-1}) \quad (2)$$

where $H_{newton}(w_n) \in R^{M \times M}$ is the Hessian of the objective function $f$ and $g(w_n) \in R^M$ is the gradient of the objective function $f$ evaluated at $w_n$. Shanno's algorithm is a type of modified Newton's algorithm, which approximates the inverse of the Hessian $H_{newton}^{-1}(w_n)$ by the Shanno approximation, a positive definite matrix denoted by $H^{-1}(w_n)$. The Shanno approximation matrix is implicitly determined by the gradients of the two recent iterations, a search direction and a step-size of previous iteration. The complexity of the implicit calculation of $H^{-1}(w_n)$ is of O(M) as opposed to $O(M^2)$ for the calculation of $H_{newton}^{-1}(w_{n-1})$. Let $g: R^M \rightarrow R^M$ be the gradient of the objective function $f: R^M \rightarrow R$ where w is the filter tap weight vector, and M is the dimension of the filter tap weight vector. Shanno's algorithm builds up a trajectory of $w_0, w_1, w_2, \ldots$ recursively according to:

$$w_j = w_{j-1} + \gamma_j d_j \quad (3)$$

where $d_j$ is the search direction calculated by:

$$d_j = -H^{-1}(w_{j-1})g(w_{j-1}). \tag{4}$$

Shanno's approximation of the inverse of the Hessian:

$$H^{-1}(w_{j-1}) = I - \frac{u_j d_{j-1}^H + d_{j-1} u_j^H}{d_{j-1}^H u_j} + c_j \frac{d_{j-1} d_{j-1}^H}{d_{j-1}^H u_j} \tag{5}$$

where $$c_j = \gamma_{j-1} + \frac{|u_j|^2}{d_{j-1}^H u_j}, \tag{6}$$

$$u_j = g(w_j) - g(w_{j-1}), \tag{7}$$

$\gamma_j$ is a positive real number that satisfies:

$$f(w_{j-1}+\gamma_j d_j) \leq f(w_{j-1}) + \alpha\gamma_j g(w_{j-1}{}^H) d_j \tag{8}$$

and $$g(w_{j-1}+\gamma_j d_j)^H d_j \geq \beta g(w_{j-1})^H d_j, \tag{9}$$

where $0<\alpha<\beta<1$. If $\gamma_n$ satisfies the above constraints, the algorithm is guaranteed to converge to a set of critical points. Shanno's Algorithm is discussed in the context of Nuural Networks and in the context of TDMA channel equalization. Special considerations are needed to apply Shanno's algorithm to achieve an efficient and powerful multiuser detector. Section 4 deals with these considerations.

In order to apply Shanno's algorithm in a CDMA setting, the CMA objective function was extended to admit block processing. Let a block of data be defined as:

$$D_i = [x((i-1)N) \vdots x((i-1)N+1) \vdots \cdots \vdots x(iN-1)] \in C^{M \times N}. \tag{10}$$

for which a block CMA objective function:

$$f(w) = \frac{1}{4N} \sum_{l=0}^{N-1} \left[ |w_c^H x((i-1)N+l)|^2 - 1 \right]. \tag{11}$$

is minimized. In (11), $x((i-1)N+1)\delta C^M$ represents the received signal vector corresponding to the $n^{th}$ transmitted symbol interval where $n=(i-1)N+1$, $i \geq 0$, and $0 \leq 1 \leq N$. The length of x is equal to the length of the spreading code. Here k is the time index (or block index) for the input data, and $w_c$ is the complex filter tap weight vector. Since the Shanno algorithm is designed around real arithmetic, block objective function was modified to accommodate complex input signals involved with complex Rayleigh fading channels. First, a real vector is defined containing the complex weights:

$$w = \begin{bmatrix} \text{Re}[w_c] \\ \text{Im}[w_c] \end{bmatrix} \tag{12}$$

and then define two kinds of real vectors containing complex data:

$$x_f(n) = \begin{bmatrix} \text{Re}[x(n)] \\ -\text{Im}[x(n)] \end{bmatrix} \quad x_b(n) = \begin{bmatrix} \text{Im}[x(n)] \\ \text{Re}[x(n)] \end{bmatrix}. \tag{13}$$

Next scalar and vector functions are defined in order to implement the complex operations involved in equation (11) along with the number of real multiplications required to calculate them in terms of the spreading code length and the block size (which will be used for complexity analysis later):

$$v(n) = (w^T x_f(n))^2 + (w^T x_b(n))^2 - 1 (4M \text{ ops}) \tag{14}$$

$$= w^T X(n) w - 1 \tag{15}$$

where $$X(n) = x_f(n) x^T{}_f(n) + x_b(n) x_b{}^T(n)(4M \text{ ops}) \tag{16}$$

and $$v(n) = [w^T x_f(n)] x_f(n) + [w^T x_b(n)] x_b(n) = X(n) w (4M \text{ ops}). \tag{17}$$

Substitute equations (12)–(17) into equation (11), to obtain the block CMA objective function with respect to the real filter tap weights w as follows:

$$f(w) = \frac{1}{4N} \sum_{n=0}^{N-1} v(n)^2 (4MN \text{ ops}) \tag{18}$$

$$= \frac{1}{4N} \sum_{n=0}^{N-1} [w^T X(n) w - 1]^2.$$

The gradient with respect to w is thus $$\nabla f(w) = g(w) = \frac{1}{N} \sum_{n=0}^{N-1} v(n) v(n) (6MN \text{ ops}) \tag{19}$$

$$= \frac{1}{N} \sum_{n=0}^{N-1} [w^T X(n) w - 1] X(n) w.$$

The Block Shanno CMA (BSCMA) uses these functions to minimize the gradient of the objective function. For multiuser environments over fast fading channels, the number of updates required to minimize the cost function increase rapidly which results in increased computations. For suitably large block-sizes, it is observed that improved results are obtained within 4 to 5 updates in the filter tap weights. Since the BSCMA technique used by Wang, et al., is blind, the output constellations are rotated occasionally, which may be fixed by making decisions based on a rotated principal axis or performing suitable forms of carrier tracking. The Multiuser Block Shanno (MBSCMA) algorithm for use in error correction of non-linear changes in coded signals solves the problem of blind error direction selection is presented below:

Let i (initally set to 0) denote the index for data blocks, $f(w)$ be the block CMA objective function defined in equation (14), evaluated at $w^j{}_i$ and $g(w^j{}_i)$ be the gradient defined in equation (15) evaluated at $w^{j-1}{}_i$.

Step I. Form a block of data Di (of size M×N where N is the block size) from the received signal using equation (10). Set j=0. Initialize the filter tap weight vector ($w^0{}_0$) to the spreading code of the desired user.

Step II. Do
1. j=j+1;
2. Calculate the gradient for this block of data at $w^{j-1}{}_i$ using equation (19) (6MN ops);
3. If j is equal to one then set $d^j{}_i = -g(w^{j-1}{}_i)$ else $$d_n = -g(w_{n-1}) + a_n u_n + (b_n - c_n a_n) d_{n-1}. (4M \text{ ops}) \tag{20}$$

where $$u_i^j = g(w_i^{j-1}) - g(w_i^{j-2}), \ a_i^j = \frac{d_i^{j-1^T} g(w_i^{j-1})}{d_i^{j-1^T} u_i^j}(4M \text{ ops}) \quad (21)$$

$$b_i^j = \frac{u_i^{j^T} g(w_i^{j-1})}{d_i^{j-1^T} u_i^j}(2M \text{ ops}), \ c_i^j = \gamma_i^{j-1} + \frac{|u_i^j|^2}{d_i^{j-1^T} u_i^j}(2M \text{ ops})$$

4. Updatedate the filter tap weights:

$$w_n = w_{n-1} + \gamma_n d_n (2M \text{ ops}) \quad (22)$$

where $\gamma_i^j$ is a positive real number that satisfies constraints (8) and (9).

5. If $|g(w_i^j)|$ is sufficiently small or if j equals 5 then go to Step III, else go to the beginning of step II. If $|g(w_i^j)|$ is too large ($\geq 5*$(norm of the spreading sequence)), set the filter weights to the spreading code of the user, set j=0, and go to Step II.

Step III. Generate output for this block ($y_i = W_{ci}^{jH} D_i$), form the next block of data ($D_{i+1}$), set $w^0_{i+1} = w^j_i$, j=0, i=i+1 and go to Step II.

It is seen that calculating ($\gamma_n$), which satisfies (8) and (9), requires on average 25.6MN calculations for each block. Using the operation counts provided for the MBSCMA algorithm thus far, the average number of multiply and accumulates required for each block are 28.6M+11M/N per output point as compared to the MMSE algorithm which requires $3M^2+7M$ multiply and accumulate operations. For a block size of N=100 and spreading codes of length M=16, 32 and 64, the proposed algorithm results in a reduction in complexity by a factor of (approximately) 1.9, 3.6 and 6.9, which closely match results obtained from the flop-counts in Matlab simulations. When compared with the multiuser CMA algorithm, the MBSCMA algorithm is more expensive requiring, for the same parameters, an increase in computations. As discussed previously, however, prior art methods generally require a priori information to set the stepsize $\mu$ depending on both the channel fading rate and the power of the interferers. It is seen that under a very broad sets of conditions the algorithm diverges. Until these issues are resolved the Constant Modulus algorithm does not appear to be suitable for real-time applications.

Figure 8:
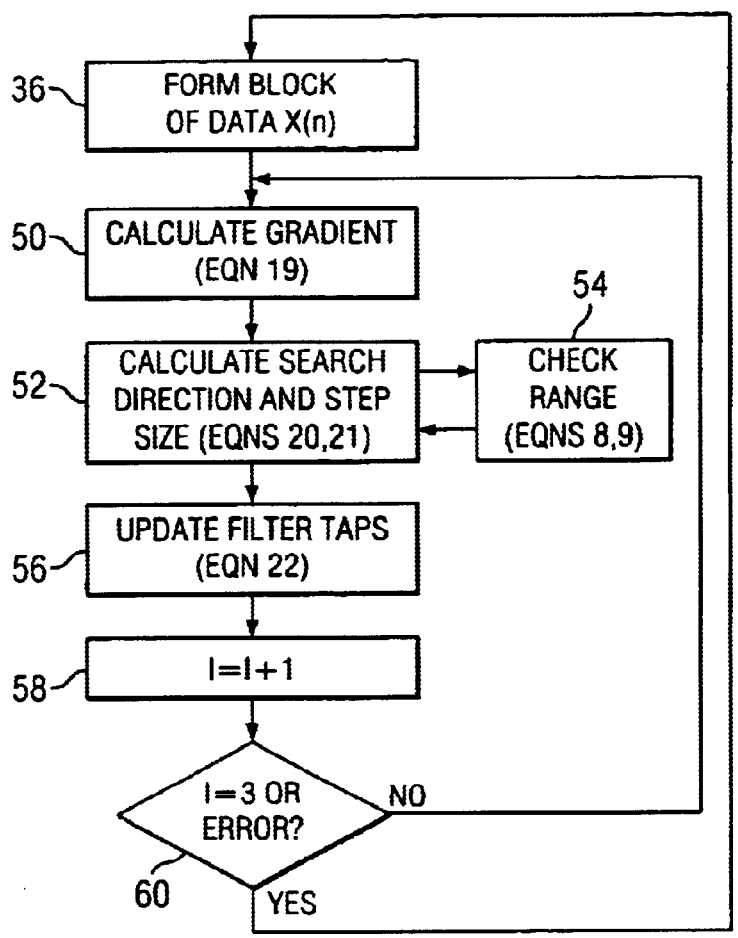
FIG. 8 is a flow chart illustrating an error correction method in accordance with the present invention.

FIG. 8 is a flow chart illustrating a method to update a set of filter taps in a CDMA receiver. This method is preferably performed in the block-nonlinear filter update processor as depicted in FIG. 7. This method is applied to generate a tap weight vector which can be used to process the input CDMA waveform to minimize the norm of the output errors. A form block of data X(n), such as block former 36 is used to calculate a gradient as step 50, using, e.g., equation 19, hereinabove. Next, a step size and direction is calculated using equations 20 and 21 at step 52. A range check 54 may also be used during the calculate search direction and step size step 52. The filter taps are upgraded using equation 22, at step 56. The number of iterations, if any, is calculated in step 58 before reaching a decision box 60 in which the value of the iterations is calculated. If the number of iterations has been reached, then a new block of data is obtained from the data source, e.g., a cell phone CDMA transmission and the data is run through the error correction system disclosed hereinabove.

Figure 9:
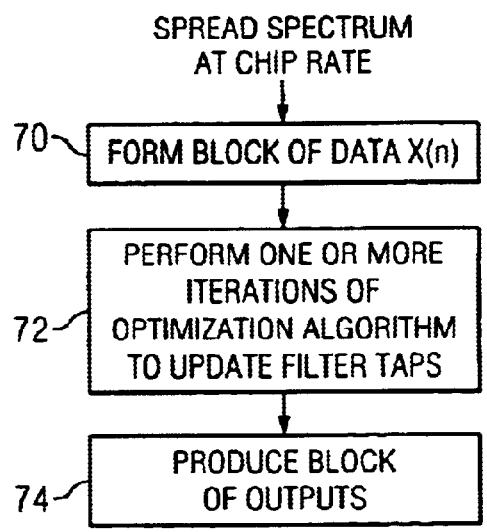
FIG. 9 is a flow chart illustrating the adaptive filtering method in accordance with the present invention.

FIG. 9 is a flow chart illustrating the adaptive filtering method in accordance with the present invention. Spread spectrum data is obtained at the Chip rate. A block of data is formed at 70, before performing a number of interations in which the optimization algorithm disclosed herein is used to update the filter taps at 72. Finally, the updated tap filter weights are used to correct the errors in the data, if any, to produce output blocks of data 74, which are then permitted to continue for further amplification and use by, e.g., the base station to transmit data to the user or users.

In one particular example of an embodiment of the present invention a communications receiver having an adaptive filter adapted to minimize an error function may be constructed. The adaptive filter can be coded into hardware, such as an application specific integrated circuit (ASIC) digital signal processor or can be embodied in software. As described hereinabove, the error function is calculated using differences between output blocks generated by the adaptive filter. The output blocks will generally correspond to repeated blocks inherent in a communications protocol used by the CDMA receiver.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A spread spectrum receiver comprising a block former coupled to receive samples of a spread spectrum waveform, said samples being sampled at a specified chip rate, said block former also being coupled to a memory and operative to store a block of data therein;

a gradient calculation module coupled to said memory and to a tap-weight vector calculation module, said gradient calculation module is operative to receive said data block from said memory and a tap weight vector from said tap weight vector calculation module, said gradient calculation module further being operative to compute a gradient vector with respect to an error function with respect to said tap weight vector;

a search direction calculation module coupled to receive a gradient vector from said gradient calculation module and coupled to receive a previous search direction via a feedback path, said search direction calculation module operative to compute a search direction as a function of said previous search direction and the two most recently computed gradient vectors;

a stepsize calculation module coupled to said memory, and to said tap weight vector calculation module, said stepsize calculation unit operative to compute a step size according to a prespecified criterion;

a tap-weight vector calculation module coupled to receive input from said search direction calculation module and said step size calculation module, and a previous tap weight vector via a feedback path, said tap weight vector calculation module operative to compute a subsequent search direction as a function of said previous tap weight vector, said step size and said previous tap weight vector to produce an updating rule; and an output module operative to couple a linear combination of said tap weight vector with a selected set of said samples of said spread spectrum waveform to produce a block of output symbol values.

2. The method of claim 1, wherein said updating rule comprises the modified block Shanno constant modulus algorithm.

3. The method of claim 1, wherein said updating rule minimizes a constant modulus objective function.

4. The method of claim 1, wherein said updating rule does not require c step size parameters to be set a priori based on signal and channel power considerations.

5. The method of claim 1, wherein said updating rule optimizes a nonlinear objective function using a nonlinear optimization algorithm adapted for adaptive processing using block processing.

6. The method of claim 1, wherein said updating rule optimizes a nonlinear objective function using a nonlinear optimization algorithm adapted for adaptive processing using non-Toeplitz block processing.

7. The method of claim 1, wherein said updating rule optimizes a nonlinear objective function using a nonlinear optimization algorithm adapted for adaptive processing using a step size that satisfies restrictions at each update.

8. The method of claim 1, wherein said updating rule optimizes a nonlinear objective function using a nonlinear optimization algorithm adapted for adaptive processing using multiple updates per block.

9. The method of claim 1, wherein said updating rule optimizes a nonlinear objective function using a nonlinear optimization algorithm that provides for a gradient descent at each update.

10. The method of claim 1, wherein said updating rule optimizes a nonlinear objective function using a block difference objective function.

11. The method of claim 1, wherein said method comprises CDMA transmissions.

12. The method of claim 1, wherein said method comprises TDMA transmissions.

13. The method of claim 1, wherein said method is implemented in cellular telephone transmissions.

14. A method of extracting a data sequence from a spread spectrum waveform, the data sequence being associated with a specified user, the method comprising steps of:
  receiving an input spread spectrum signal and sampling said signal at a chip rate;
  initializing an adaptive filter with a despreading code, said despreading code associated with said specified user;
  filtering said spread spectrum signal by said adaptive filter to produce an output, said filtering occurring at said chip rate, and said filtering producing outputs at a symbol rate;
  comparing said output signal to at least one threshold level and deciding on the value of a recovered data symbol based on said comparison to produce a recovered output symbol; and
  updating a set of filter coefficients using an updating rule, said filter coefficients being used in said step of filtering, wherein said updating rule implements a nonlinear optimization algorithm adapted for time-varying environments using blocks of data.

15. The method of claim 14, wherein said updating rule is the modified block Shanno constant modulus algorithm.

16. The method of claim 14, wherein said updating rule minimizes a constant modulus using an objective function.

17. The method of claim 14, wherein said updating rule does not require a set of step size parameters to be set a priori based on signal and channel power considerations.

18. The method of claim 14, wherein said updating rule optimizes a nonlinear objective function using a nonlinear optimization algorithm adapted for adaptive processing using block processing.

19. The method of claim 14, wherein said updating rule optimizes a nonlinear objective function using a nonlinear optimization algorithm adapted for adaptive processing using a step size that satisfies restrictions at each update.

20. The method of claim 14, wherein said updating rule optimizes a nonlinear objective function using a nonlinear optimization algorithm adapted for adaptive processing using multiple updates per block.

21. The method of claim 14, wherein said updating rule optimizes a nonlinear objective function using a nonlinear optimization algorithm adapted for adaptive processing using a block gradient descent at each update.

22. The method of claim 14, wherein said updating rule optimizes a nonlinear objective function using a nonlinear optimization algorithm adapted for adaptive processing using a block difference objective function.

23. The method of claim 14, wherein said updating rule optimizes a nonlinear objective function using a nonlinear optimization algorithm adapted for adaptive processing using a non-Toeplitz block difference objective function.

24. The method of claim 14, wherein said method comprises CDMA transmissions.

25. The method of claim 14, wherein said method comprises TDMA transmissions.

26. A CDMA receiver structure comprising:
  an adaptive filter with an input coupled to an analog to digital converter and an output coupled to a decision device, said adaptive filter comprising a filter tap weight vector, wherein said filter tap weight vector is initialized with at least a portion of a spreading code associated with a user;
  a block-nonlinear filter update processor coupled to receive a block of data from said analog to digital converter and said adaptive filter tap weigh vector, said block-nonlinear filter update processor having an output coupled to provide a new set of tap weight values back to said adaptive filter, said block-nonlinear filter update processor operative to perform one or more iterations of a nonlinear optimization algorithm on said block of data.

27. A method of extracting a data sequence from a spread spectrum waveform, the data sequence being associated with a specified user, the method comprising steps of:
  receiving an input spread spectrum signal and sampling said signal at a chip rate;
  initializing an adaptive filter with a despreading code, said despreading code associated with said specified user;
  filtering said spread spectrum signal by said adaptive filter to produce an output, said filtering occurring at said chip rate, and said filtering producing outputs at a symbol rate;
  comparing said output signal to at least one threshold level and deciding on the value of a recovered data symbol based on said comparison to produce a recovered output symbol; and
  updating a set of filter coefficients using an updating rule, said filter coefficients being used in said step of filtering, wherein said updating rule is a modified block Shanno constant modulus algorithm.

28. A method of extracting a data sequence from a spread spectrum waveform, the data sequence being associated with a specified user, the method comprising steps of:
  receiving an input spread spectrum signal and sampling said signal at a chip rate;
  initializing an adaptive filter with a despreading code, said despreading code associated with said specified user;
  filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and minimizes a constant modulus using an objective function.

29. A method of extracting a data sequence from a spread spectrum waveforrn, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and does not require a set of step size parameters to be set a priori based on signal and channel power considerations.

30. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using block processing.

31. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using a step size that satisfies restrictions at each update.

32. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using multiple updates per block.

33. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using a block gradient descent at each update.

34. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using a block difference objective function.

35. A method of extracting a data sequence from a spread spectrum waveform, the data sequence being associated with a specified user, the method comprising steps of:

receiving an input spread spectrum signal and sampling said signal at a chip rate;

initializing an adaptive filter with a despreading code, said despreading code associated with said specified user;

filtering said spread spectrum signal by said adaptive filter to produce an output, said filtering occurring at said chip rate, and said filtering producing outputs at a symbol rate;

comparing said output signal to at least one threshold level and deciding on the value of a recovered data symbol based on said comparison to produce a recovered output symbol; and updating a set of filter coefficients using an updating rule, said filter coefficients being used in said step of filtering, wherein said updating rule implements a nonlinear optimization algorithm, adapted for time-varying environments using blocks of data, and optimizes a nonlinear objective function using a nonlinear optimization algorithm adapted for adaptive processing using a non-Toeplitz block difference objective function.

\* \* \* \* \*